United States Patent [19]

Francis, Jr.

[11] 4,105,367
[45] Aug. 8, 1978

[54] LIQUID LEVEL SENSING CIRCUIT

[75] Inventor: Ralph M. Francis, Jr., Racine, Wis.

[73] Assignee: Sta-Rite Industries, Racine, Wis.

[21] Appl. No.: 733,520

[22] Filed: Oct. 18, 1976

[51] Int. Cl.² .................... F04B 49/06; H01H 35/18
[52] U.S. Cl. .................................. 417/36; 307/118;
318/482; 417/44
[58] Field of Search ............... 417/36, 44, 38, 40;
307/118; 73/304 R; 137/392; 318/482

[56] References Cited

U.S. PATENT DOCUMENTS

| | | | |
|---|---|---|---|
| 3,206,615 | 9/1965 | LaPointe | 73/304 R |
| 3,252,420 | 5/1966 | Sorensen | 417/36 |
| 3,431,858 | 3/1969 | Lynn, Sr. et al. | 417/36 X |
| 3,496,380 | 2/1970 | Jones | 307/118 |
| 3,502,899 | 3/1970 | Jones | 417/36 X |
| 3,540,027 | 11/1970 | Rauth et al. | 417/36 X |
| 3,584,643 | 6/1971 | Burke | 137/392 |
| 3,667,022 | 5/1972 | Quinn | 417/36 X |
| 3,671,142 | 6/1972 | Calabrese | 417/36 |
| 3,772,531 | 11/1973 | Webb et al. | 307/118 X |
| 3,858,102 | 12/1974 | Quinn | 307/118 X |

Primary Examiner—Carlton R. Croyle
Assistant Examiner—Edward Look

Attorney, Agent, or Firm—Mason, Kolehmainen, Rathburn & Wyss

[57] ABSTRACT

A circuit for sensing and controlling the level of fluid within a reservoir includes a pump for controlling the level of fluid. The circuit further includes two sub-circuits each including a probe adapted to contact the fluid. Each sub-circuit further includes an SCR and an oppositely poled diode. Also included is a relay coupled to the sub-circuits for operating the pump. The relay is designed to energize the pump only upon submersion of both of the probes. The circuit is coupled to an AC transformer having, in one embodiment, an off-set center tap such that upon submersion of the first probe the first sub-circuit conducts a first magnitude of energy that is insufficient to pull in the relay but is sufficient to hold in the relay once it is actuated. In an alternative embodiment, the transformer includes first and second resistors coupled between the relay and the first and second sub-circuits, respectively. The resistors may be of the same or different impedance, such that a different energy level is imparted to the relay when the first probe is in contact with the fluid than when both probes are in contact with the fluid.

3 Claims, 2 Drawing Figures

LIQUID LEVEL SENSING CIRCUIT

BACKGROUND OF THE INVENTION

A. Field of the Invention

The present invention relates to circuits for sensing and controlling the level of fluid in a reservoir or similar fluid container.

B. Description of the Prior Art

In fluid systems that include a fluid reservoir for storing fluid, the level of fluid in the reservoir often must be controlled to prevent overflow. Control of the fluid level is often accomplished by an electrical circuit that senses the level of fluid and energizes a pump mounted in the reservoir to pump fluid out of the reservoir thereby maintaining the fluid in the reservoir at a desired level.

Typical prior art procedures employed to accomplish fluid level control include one or more probes adapted to contact the fluid. The probes are typically placed within the reservoir at a lower and an upper position to contact the fluid at different levels in the reservoir. These probes are electrically coupled to a circuit that operates a pump for pumping the fluid out of the reservoir. Since the probes are often submerged for long periods of time, it is also desirable that the probes will not be subjected to plating of contaminants in the fluid. Accordingly, it is preferrable that the probes be coupled to an AC source.

Typical prior art circuits employ one or more complex circuits often including a plurality of probes and, in some instances, circuit elements such as a flip-flop memory and logic channels. An example of this type of prior art control circuit is disclosed in U.S. Pat. No. 3,741,683. Other prior art circuits employ a plurality of transistors and SCR's resulting in a complex circuit. Examples of such a circuit are illustrated in U.S. Pat. No. 3,657,556 and 3,858,102. In addition, prior art circuits may also employ triacs and other expensive elements. An example of this type of prior art circuit is illustrated in U.S. Pat. No. 3,787,733.

Each of these prior art circuits is complex and expensive and, as a result, requires a substantial amount of servicing and are expensive to manufacture.

SUMMARY OF THE INVENTION

An object of the present invention is to provide a new and improved level control circuit for controlling the level of fluid within a reservoir.

Another object of the present invention is to provide a new and improved circuit for controlling the level of fluid within a reservoir that is simple and inexpensive.

A further object of the present invention is to provide a new and improved liquid level control circuit having at least two probes either of which may serve as the lower probe.

An additional object of the present invention is to provide a new and improved liquid level control circuit for controlling the level of fluid in a reservoir including one or more probes positioned within the reservoir and coupled to an AC source to prevent plating of contaminants on the probes.

In brief, the above and other objects of the present invention are achieved by providing an improved liquid level control circuit that includes an upper and a lower probe that are positioned within a reservoir containing fluid. Electrically coupled to the circuit is a pump that is energized to control the level of fluid within the reservoir.

Each of these probes is connected to a sub-circuit and each sub-circuit includes an SCR and a diode. A transformer is included in the circuit to provide a source of alternating current. The secondary winding of the transformer in one embodiment includes an off-set center tap such that the lower probe is coupled to fewer turns of the secondary winding than is the upper probe.

Also included in the circuit and electrically coupled to each of the sub-circuits is a relay. The relay includes normally open contacts that are electrically coupled to the pump. When the contacts are closed, the pump is energized to pump fluid from the reservoir. The relay further includes a winding that is electrically coupled through each of the first and second SCR's and when energized closes the contacts. The relay is constructed such that upon contact of the first or lower probe with fluid in the reservoir, the first SCR becomes conductive thus energizing the relay winding. This energization level imparted to the relay is insufficient to close the contacts. However, once both the lower and upper probes are in contact with the fluid, the combined energization level imparted to the relay through both of the SCR's is sufficient to close the contacts thereby energizing the pump.

As the fluid is pumped out of the reservoir, the fluid level drops below the upper probe and its respective sub-circuit ceases to conduct. However, the reduced level of energization to the relay through the sub-circuit electrically coupled to the lower probe is sufficient to maintain the contacts closed. Upon the level of fluid being lowered to below the lower probe, the first sub-circuit is no longer conductive and the contacts open terminating the operation of the pump.

An alternative embodiment of this circuit includes a center tap on the secondary winding of the transformer. In addition, a resistor is included in series with the relay and each of the SCR's. These resistors may be of different values such that the relay coil is coupled to different energization levels upon immersion of each of the probes producing a result substantially similar to the result provided by the off-set center tap.

Moreover, the resistors may be of equal value or not included in the circuit, since the relay is designed such that full energization upon both probes being immerged will close the contacts and only approximately one-half of the energy level which results from only the lower probe being immerged is sufficient to maintain the contacts closed. In this manner, either of the probes may be used as the lower probe.

BRIEF DESCRIPTION OF THE DRAWING

The present invention together with the above and other objects and advantages will best appear from the following detailed description of two illustrative embodiments of the invention, wherein.

DESCRIPTION OF THE PREFERRED EMBODIMENT

Figure 1:
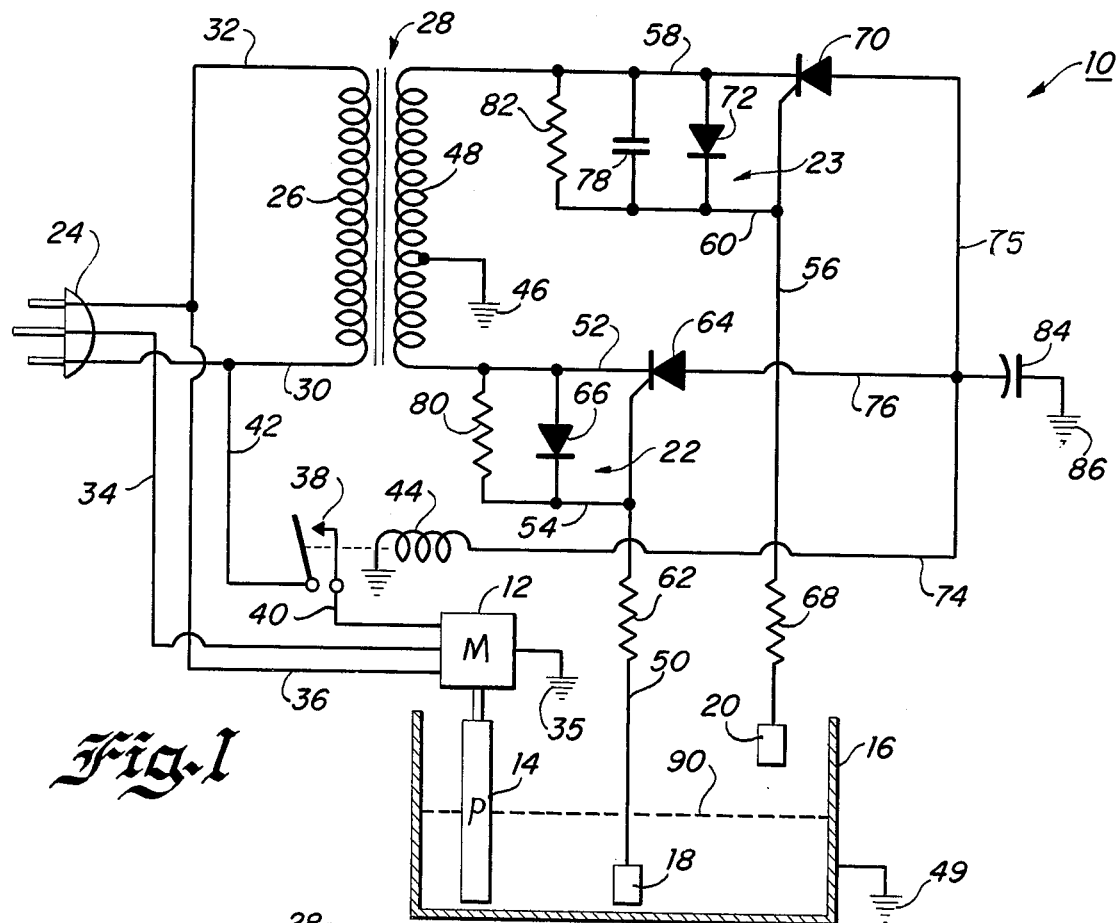
FIG. 1 is a diagrammatic illustration of a circuit constructed in accordance with the principles of the present invention.

Having reference now to the drawing, and initially to FIG. 1, there is illustrated a pump control circuit designated as a whole by the reference number 10 employed to control the operation of a pump motor 12. The motor 12 operates a pump 14 to control the level of fluid in a tank or sump 16.

The system including the circuit 10, the motor 12, and the pump 14 may be used to control the level of water in the sump 16 in order to prevent overflow. This is accomplished by operating the pump 14 intermittently in response to detected water level conditions. In order to operate the pump 14 at the proper time, the circuit 10 includes a lower limit probe 18 and an upper limit probe 20 positioned within the tank 16 to sense the level of fluid. The circuit 10 of the present invention operates in a reliable and simple manner to energize the motor 12 when the water level rises to the level of the upper probe 20 and to de-energize the motor 12 when operation of the pump 14 causes the water level to fall below the level of the lower probe 18.

More specifically, the circuit 10 includes two sub-circuits generally designated as 22 and 23. The sub-circuit 22 is coupled to the lower probe 18 and is operative when the probe 18 contacts fluid in the tank 16. However, the operation of only the sub-circuit 22 is not effective to activate the motor 12. Once the fluid in the tank 16 reaches the probe 20, the sub-circuit 23 is also operative and, as a result of simultaneous operation with sub-circuit 22, operation of the motor 12 is initiated. As the level of the fluid in the tank 16 is lowered to a point below the upper probe 20 due to operation of the motor 12 and pump 14, the sub-circuit 23 is rendered inoperative. However, operation of the sub-circuit 22 alone is sufficient to continue operation of the motor 12 and pump 14 until the fluid level in the tank 16 drops below the lower probe 18. At this time, operation of the motor 12 is discontinued.

The specific structure to accomplish this procedure includes the circuit 10. To supply the circuit 10 with energy it is connected to an AC source by plug 24 which in turn is connected to the primary coil 26 of a transformer 28 by the leads 30 and 32. In addition, the motor 12 is connected to the ground contact of the plug 24 by a lead 34 and to the ground 35 through its casing. The motor 12 is also coupled to one side of the AC source by a lead 36. Connection of the motor 12 to the other side of the AC source is controlled by a normally open set of relay contacts connected to the motor 12 by lead 40 and to lead 30 by a lead 42. Accordingly, the motor 12 is only energized to drive the pump 14 when the contacts 38 are closed.

Closure of contacts 38 is controlled by a relay coil 44. The relay coil 44 is designed to pull in or close the contacts 38 only when the fluid in the tank 16 reaches the level of the upper probe 20. More specifically, the circuit 10 is designed to provide the relay coil 44 with a larger current when both of the probes 18 and 20 are submerged than when only the lower probe 18 is submerged. Moreover, the relay coil 44 is designed such that the larger current, when both of the probes 18 and 20 are submerged, is necessary to pull in and, thus, activate the switch 38, but the smaller current resulting when only the lower probe 18 is submerged is sufficient to hold the relay coil 44 in after being activated.

The difference in the magnitude of current applied to the relay 44 is a consequence of the center tap 46 on the secondary winding 48 of the transformer 28. In the embodiment of FIG. 1 the center tap 46 is offset such that fewer turns are connected to the lower probe 18 through leads 50, 52, and 54 than to the upper probe 20 through leads 56, 58 and 60.

The lower level probe 18 is connected to the secondary winding 48 through a resistor 62 and the gate-cathode circuit of a SCR 64 on one-half cycle, and through diode 66 and the resistor 62 on the opposite half cycle. The upper level probe 20 is connected to the secondary winding 48 through a resistor 68 and the gate-cathode circuit of a SCR 70 on one-half cycle and through the diode 72 and the resistor 68 on the other half cycle.

Current to the coil 44 is controlled by the SCR's 64 and 70, and the relay coil 44 is coupled to the secondary winding 48 through both of the SCR's 64 and leads 74, 75, and 76, respectively.

The SCR's 64 and 70 are protected from reverse biasing of their gates by diodes 66 and 72, respectively. Furthermore, the SCR 70 is protected from spurious gating signals by the capacitor 78. The resistors 80 and 82 serve as gate biasing resistors for the SCR's 64 and 70, respectively, to return the gates to the same potential as their cathodes. A capacitor 84 is included to serve as a DC filter capacitor to prevent chatter and to raise the effective D.C. level.

To control the level of fluid in the tank 16, the system operates in the following manner. If the fluid in the tank 16 is below the lower probe 18, the probe 18 is not coupled to ground and the SCR 64 does not conduct. Upon the fluid reaching a level such as level 90, a voltage dividing chain is completed from the secondary winding 48 to the ground 49 coupled to the tank 16 through the probe 18. On positive half cycles, current flows from the secondary winding 48, through the diode 66 to the probe 18 and to the ground 49 effectively, to the center tap 46. On negative half cycles, current flows from ground 49 through the probe 18 to the gate and cathode of the SCR 64 and then to ground 49 or the center tap 46. This renders the SCR 64 conductive and current flows from the relay coil 44 through the conducting SCR 64 to the center tap 46. The current through the relay coil 44 while only the lower probe 18 is submerged is insufficient to actuate the switch 38. Accordingly, fluid is not pumped out of the tank 16 when only the lower probe 18 is submerged.

Once the fluid reaches a level such that the upper probe 20 is submerged, current flows to the upper probe 20 in a manner such that the SCR 70 is conductive on the half cycles opposite to that of the SCR 64. Consequently, the relay coil 44 is provided with an increased current sufficient to pull in the relay coil 44 activating the switch 38 and, thus, the motor 12.

As fluid is pumped out of the tank 16, the fluid level drops below the upper probe 20 and the SCR 70 is again nonconductive. During this period of operation, the relay coil 44 is only coupled to the lesser number of windings on the secondary winding 48; however, by design, this lesser current across the relay coil 44 is sufficient to hold the relay contacts 38 in so as to continue to activate the motor 12. Once the fluid level drops below the lower probe 18, the SCR 64 is no longer conductive and the switch 38, the motor 12, and the pump 14 are de-energized.

During the operation of the circuit 10 in the above described manner, full wave AC is applied to the probes 18 and 20 thereby preventing plating of contaminants on the probes 18 and 20. In addition, the values of the resistors 62 and 68 can be selected to adjust the sensitivity of the probes 18 and 20 such that they will not prematurely energize if contacted by foam or similar material.

Figure 2:
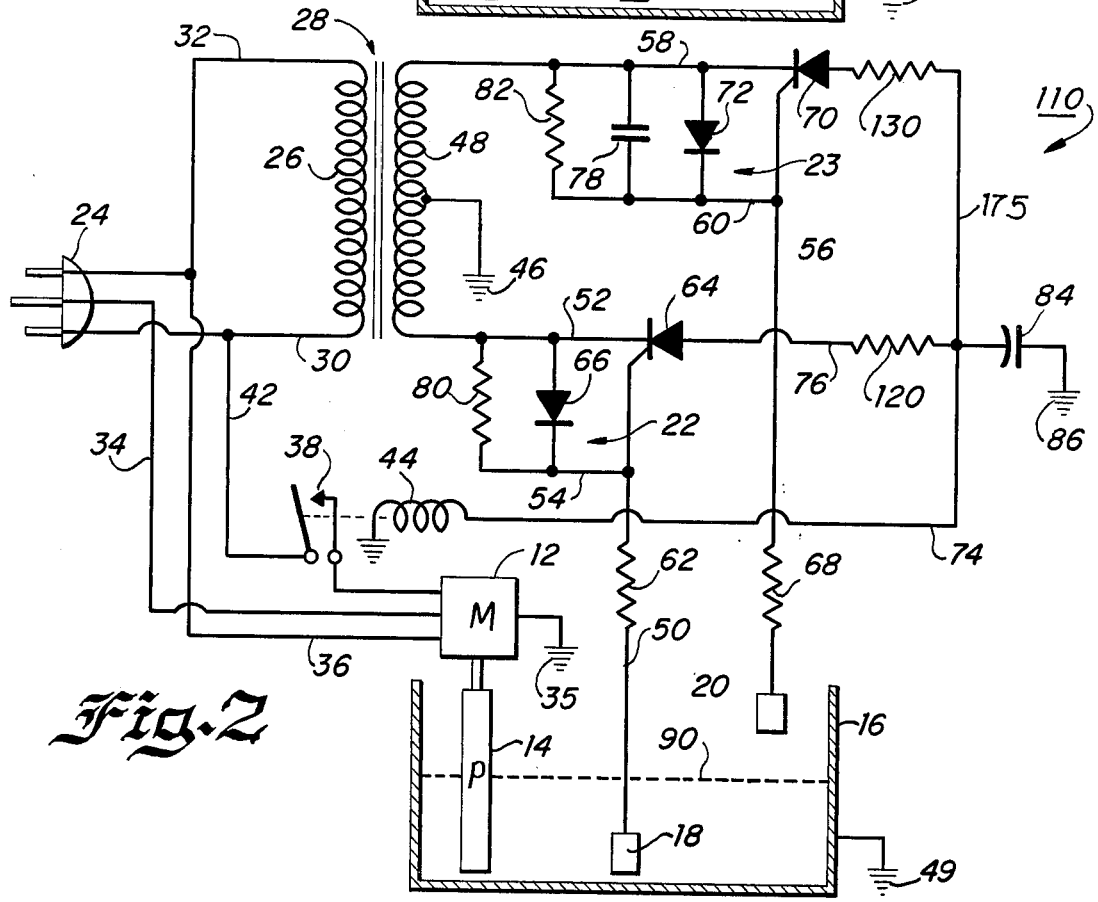
FIG. 2 is a diagrammatic illustration of an alternative embodiment of the circuit illustrated in FIG. 1.

The application of different currents when one and both of the probes are submerged can also be accomplished by employing resistors or preselected values in place of an off-set center tap. FIG. 2 depicts an alternative embodiment of the circuit 10 employing resistors 120 and 130 in place of an off-set center tap such as center tap 46.

To assist in understanding the operation of the circuit in FIG. 2, the elements in FIG. 2 that correspond both in structure and operation to those discussed previously with respect to the embodiment illustrated in FIG. 1 are designated by the same reference number. As illustrated in FIG. 2, the circuit generally designated as 110 has a symmetrical center tap 146 and includes unequal value resistors 120 and 130 coupled to the leads between the SCR's 64 and 70, respectively, and the relay coil 44. Consequently, as each of the probes 18 and 20 are submerged by fluid, the different current levels across the relay coil 44 may be substantially the same as described with respect to the above circuit 10.

Additionally, the relay coil 44 can be designed such that the resistors 120 and 130 can be equal in value or eliminated from the circuit 110. In this embodiment, the current across the relay coil 44 when only the lower probe 18 is submerged will be approximately one-half of the current when both probes 18 and 20 are submerged. The relay coil 44 is designed so that it does not pull in when only one-half of the full current is applied, but this magnitude is sufficient to hold the relay coil 44 in once it has pulled in after both of the probes 18 and 20 have been submerged. This embodiment has the advantage that it may be installed with either probe 18 or 20 as the lower probe.

While the invention has been described with reference to details of the illustrated embodiments, it should be understood that such details are not intended to limit the scope of the invention as defined in the following claims.

What is claimed and desired to be secured by Letters Patent of the United States is:

1. A fluid level sensing circuit comprising a probe adapted to contact a conductive fluid, an SCR having its anode-cathode circuit connected to a source of AC operating potential, the gate of said SCR being coupled to said probe, a diode coupled between said probe and the cathode of said SCR, said diode being oppositely poled with respect to the gate-cathode circuit of the SCR to permit AC conduction at the probe-fluid contact and a transformer having a primary winding and a secondary winding, and an off-set center tap electrically coupled to said secondary winding, further comprising a second probe, a second SCR having its anode-cathode circuit connected to said source, the gate of said second SCR being coupled to said second probe, and a second diode coupled between said second probe and the cathode of said second SCR, said second diode being oppositely poled with respect to said gate-cathode circuit of said second SCR to permit AC conduction at the contact of said second probe and said fluid further including a pump electrically coupled to said circuit for changing the level of said fluid, a relay for energizing said pump, first resistive means electrically coupled between said relay and said first mentioned SCR, and second resistive means electrically coupled between said relay and said second SCR.

2. A level control circuit for use with a reservoir containing a conductive liquid, upper and lower probes, and a pump for changing the level of liquid in the reservoir, said circuit comprising:

a relay having normally open contacts in said circuit with said pump for operating said pump when said contacts are closed;

said relay having a winding for closing said contacts at a pull-in energization level and for holding said contacts closed at a smaller hold energization level;

a first relay energization circuit connected to said winding for energizing said winding at a first level;

a second relay energization circuit connected to said winding for energizing said winding at a second level;

said control circuit including a transformer, said first circuit including a first SCR and a first probe adapted to contact said liquid, said first probe electrically coupled to the gate of said first SCR, the anode-cathode circuit of said first SCR electrically coupled to the secondary winding of said transformer;

said second circuit including a second SCR and a second probe adapted to contact said liquid, said second probe electrically coupled to the gate of said second SCR, the anode-cathode circuit of said second SCR electrically coupled to said secondary winding of said transformer;

a first resistive means electrically coupled to said relay winding and said first SCR, and a second resistive means electrically coupled to said relay winding and said second SCR; and means for operating said first and second relay energization circuits, respectively, in response to liquid contact with said upper and lower probes;

said first level being larger than said hold level and smaller than said pull-in level and the sum of said first and second levels exceeding said pull-in level.

3. The circuit claimed in claim 2 said transformer including an off-set center tap electrically coupled to said secondary winding.

* * * * *